(12) United States Patent
Hayes et al.

(10) Patent No.: US 6,945,734 B1
(45) Date of Patent: Sep. 20, 2005

(54) IN-SITU THERMOCHEMICAL SOLIDIFICATION OF DENSE NON-AQUEOUS PHASE LIQUIDS

(75) Inventors: Thomas D. Hayes, Schaumburg, IL (US); Vipul J. Srivastava, Woodridge, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 10/801,185

(22) Filed: Mar. 16, 2004

(51) Int. Cl.[7] .............................................. B09B 1/00
(52) U.S. Cl. ............................ 405/128.65; 405/128.4; 588/253
(58) Field of Search ........................ 405/128.1, 128.15, 405/128.2, 128.4, 128.6, 128.65, 128.9; 588/253

(56) References Cited

U.S. PATENT DOCUMENTS

| | | | |
|---|---|---|---|
| 5,587,324 A | * | 12/1996 | Roy et al. .................... 588/261 |
| 6,102,622 A | * | 8/2000 | Vinegar et al. .......... 405/128.6 |
| 6,591,702 B2 | | 7/2003 | Hayes et al. |

* cited by examiner

*Primary Examiner*—John Kreck
(74) *Attorney, Agent, or Firm*—Mark E. Fejer (57) ABSTRACT

A method for in-situ dense non-aqueous phase liquids treatment in which a subsurface source area comprising at least one rapid release contaminant is located and free water removed therefrom. The subsurface source area is then heated to a temperature suitable for extracting the at least one rapid release contaminant from the subsurface source area. The at least one rapid release contaminant is extracted from the subsurface source area, resulting in solidification of the dense non-aqueous phase liquids remaining in the subsurface source area.

12 Claims, 9 Drawing Sheets

IN-SITU THERMOCHEMICAL SOLIDIFICATION OF DENSE NON-AQUEOUS PHASE LIQUIDS

BACKGROUND OF THE INVENTION

1. Field of the Invention

This invention relates to a method for in-situ treatment of dense non-aqueous phase liquids so as to immobilize them in the subsurface, thereby reducing the release rates of contaminants of concern disposed therein, such as benzene and naphthalene, and providing environmentally acceptable management of a contaminated site. More particularly, this invention relates to a method for in-situ solidification of dense non-aqueous phase liquids in contaminated subsurface sites and for removal of rapidly released contaminants from such contaminated subsurface sites.

2. Description of Related Art

In the United States alone, there are thousands of sites that are contaminated with a type of dense non-aqueous phase liquids (DNAPL) comprising a mixture of components that have different physical properties and that behave differently from one another at ambient and elevated temperatures. One example of this type of contamination is the tar dense non-aqueous phase liquids generated from coal processing, such as occurred in manufactured gas plants (MGP) or in coking in the steel industry. This special type of dense non-aqueous phase liquids is mainly comprised of a heavy fraction that exists as an immobile solid at ambient temperatures and a minor fraction of light hydrocarbons (with low molecular weight and high vapor pressure), e.g. benzene and naphthalene, that exist as liquids at ambient temperatures. The compounds of the minor fraction operate to solubilize the heavy fraction when the two fractions are combined. Although the minor "solubilizing fraction" of organic compounds may comprise as little as 3% of the weight of the dense non-aqueous phase liquids, its presence determines the rheology, physical flow and mobility, partitioning of contaminants into water and gases, and rates of contaminant release to groundwater.

Contaminants of concern from MGP sites can be grouped in the following three categories:

1) Benzene, Toluene, Ethylbenzene, Xylene (BTEX)
2) Polyaromatic Hydrocarbons (PAHs)
3) Total Petroleum Hydrocarbons (TPHs).

A certain maximum contaminant level (MCL) has been established for volatile contaminants in drinking water. For example, the allowable MCL for benzene is 0.005 mg/l. This value of benzene for drinking water can be considered as very stringent regulations. However, for cleanup criteria applied to some areas of MGP sites, the non-hazardous levels are sufficient for remediation of sites. These numbers are often an order of magnitude higher than for drinking water. The benzene level for non-hazardous level concentration is 0.5 mg/l. While treating MGP sites containing tar/soil contaminated with BTEX, it is, therefore, important to accomplish the non-hazardous level of the contaminants while implementing a treatment technology.

Thus, soil/tars must be treated at operating conditions sufficient to accomplish enough removal of benzene so that residual levels are below 0.5 mg/l levels in the TCLP test. No minimum levels are defined for lighter PAHs; however, they should be removed from the soil/tar to render soil/tar immobilized.

In the U.S., there exist more than 3,000 former MGP sites. About 400 of the sites have been characterized and about 125–150 of these have received attention in the form of some type of remediation. Less than 50 sites have been satisfactorily resolved or "closed". Currently, it is estimated that over the next two decades more than 20–40 sites per year will require immediate solutions for the mitigation of highly concentrated source areas (defined as source areas with more than 1% contamination in the soil); each of these sites will contain at least three distinctive source areas requiring treatment (e.g. gas holders, relief holders, tar separators, soil hot spots). It is expected that a successfully developed in situ thermal treatment technology could be applicable to most of these sites.

At present, state of the art methods for addressing the problems of dense non-aqueous phase liquids involve thermal desorption, which is usually conducted with ex-situ processing, requiring the contaminated soil to be excavated from the subsurface. Thermal desorption typically involves heating of the contaminated soil/DNAPL material in a rotary kiln-type device at temperatures in the range of about 300° C. to about 700° C., vaporizing more than 98% of all of the organics, and disposing of the off-gas stream through combustion or condensation.

Conventional methods of applying thermal desorption to achieve in-situ removal of coal-based DNAPL have been less than highly successful. Attempts to apply classical thermal desorption temperatures in-situ to achieve efficient removal of the total DNAPL mass have been largely unsuccessful due to the inability to reach the required target temperature range of 400°–700° C. using commercial heating hardware. Barriers to reaching these temperatures in the subsurface include: 1) the heat of vaporization due to the high moisture conditions of many sites with shallow water tables, and 2) the loss of heat transfer efficiencies in soils that lose virtually all moisture (which rapidly occurs at temperatures above 200° C.). A further disadvantage of conventional thermal desorption methods is the large outputs of hydrocarbon contaminants resulting from the high temperature desorption that require expensive handling and disposal. These limitations point to the need for a new strategy for the effective use of thermal treatment.

SUMMARY OF THE INVENTION

It is, thus, one object of this invention to provide a method for handling dense non-aqueous phase liquids which does not utilize the higher temperatures required by conventional thermal desorption methods.

It is another object of this invention to provide a method for handling dense non-aqueous phase liquids which can be carried out in-situ, thereby avoiding the excavation required by conventional thermal desorption methods.

It is still a further object of this invention to provide a method for handling dense non-aqueous phase liquids which reduces the release rates of subsurface contaminants of concern to achieve risk based goals for the environmentally acceptable management of a site.

It is still a further object of this invention to provide a method for characterizing a contaminated site based upon the light fraction of dense non-aqueous phase liquids as a means of locating the subsurface areas of the site that are the major sources of rapidly released contaminants of concern from the total dense non-aqueous phase liquids mass.

It is yet a further object of this invention to provide a method for solidification and immobilization of dense non-aqueous phase liquids on a contaminated site and for removal of rapidly released contaminants from the subsurface source areas of these contaminants.

It is still another object of this invention to provide a method for handling dense non-aqueous phase liquids which eliminates the need for expensive post-treatment handling and disposal.

These and other objects of this invention are addressed by a method for in-situ dense non-aqueous phase liquids treatment, referred to herein as thermochemical solidification (TCS), comprising the steps of locating a subsurface source area comprising at least one rapid release contaminant, removing free water from the subsurface source area, heating the subsurface source area to a temperature suitable for extracting the at least one rapid release contaminant from the subsurface source area, and extracting the at least one rapid release contaminant from the subsurface source area, resulting in solidification of the dense non-aqueous phase liquids remaining in the subsurface source area. The method of this invention exploits the physical differences between the heavy and light fractions present in the dense non-aqueous phase liquids to effect an in-situ removal of the lower molecular weight compounds from the dense non-aqueous phase liquids mass, thereby leaving behind the higher molecular weight materials which are solidified when the light fraction is removed. The method of this invention can effectively treat either neat (concentrated) dense non-aqueous phase liquids or mixtures of dense non-aqueous phase liquids with soil, demolition wastes and/or sediment.

The primary components of this invention include 1) a protocol for identifying the subsurface location (the true source area) of the rapid release fraction of contaminants associated with dense non-aqueous phase liquids; 2) equipment for removing free water from the source area; 3) equipment for delivering dry heat into the source area; and 4) equipment for handling and disposal of the light fraction of organic compounds that are extracted from the source area.

Thermochemical solidification technology has considerable potential to provide substantial benefits in terms of savings for the industrial and government sectors and in terms of performance and reliability of the thermal technologies applied to the DNAPL management. In general, it is expected that the technology will be applicable to the treatment of concentrated DNAPL in shallow and deep subsurface locations. In applying the risk-based thermochemical solidification approach, savings will arise from the following advantages:

1) Volumes of soils requiring aggressive treatment will be reduced by more than 70 percent.
2) Less DNAPL to handle. Of the volumes of soils treated, DNAPL residues requiring disposal will be reduced by more than 90% because the thermochemical solidification only removes 3–10% of the mass of the DNAPL to achieve its risk-based treatment goals.
3) Verifiable in effectiveness. New protocols for the contaminant "availability" to groundwater and other receptors from IGT make verification of reduced release rates in the source areas possible.

Thermochemical solidification technology has considerable potential to provide substantial benefits for the industrial and government sectors, including the following: Substantial billion-dollar level savings nation-wide. Reduces cost of many commercial thermal treatment systems through:

1) Reducing the temperatures for thermal treatment to below 200° C.
2) Providing a risk based treatment endpoint
3) Substantially decreasing the amount of the DNAPL material that requires handling 4) Environmentally acceptable closure strategy for many types of sites:
   a) Electric and Gas Utility MGP
   b) Steel/Coking
   c) Creosote
   d) Government (DOE, DOD, etc.)

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Although not intended in any way to limit the scope of applicability of the method of this invention, the following description of the method of this invention relates to the in-situ treatment of subsurface non-aqueous phase liquids at former manufactured gas plant sites or at other industry sites having similar dense non-aqueous phase liquids characteristics to MGP operations, such as creosote, steel and coking sites. It will be understood that the method of this invention may be applied to any contaminated site containing dense non-aqueous phase liquids.

In the last several years, vapor pressure measurement tools have been developed for a rapid field measurement technology that uses vapor pressures as an indicator of the organic contaminant release potential from the source areas (i.e. subsurface soils that are sources of the contaminant transport) to receptors of concern. New commercial analytical products (e.g. Photo Ionization Detectors and Field GCs) allow the field measurement of vapor pressures of individual and/or classes of the contaminants of concern. The measurement of vapor pressures of chemicals of concern is, in principle, a good indicator of the availability of chemicals for transport from the source areas to the receptors of concern; a high vapor pressure of a contaminant indicates a high mobility and a high release rate. See, for example, U.S. Pat. No. 6,591,702 to Hayes et al., which is incorporated by reference herein in its entirety. These vapor pressures may be measured with commercially available, low-cost photo ionization detectors or the equivalent that is capable of providing repeatable and reliable measurements of the hydrocarbon vapor pressures. These detectors are employed for the measurement of a variety of volatile organic compounds (VOCs). The use of low energy lamp (9.8 eV) can exclude a variety of the hydrocarbons that have an ionization potential higher than 9.8 eV. Additionally, the use of a tube containing absorbing material filters most of the VOCs such as toluene that can interfere with the measurement of benzene. These tubes also absorb humidity to allow for a very accurate reading on the PID meter. The combination of the filter tube and the PID remove the disadvantages associated with colorimetric tubes and gas chromatographs.

This vapor pressure or fugacity-based strategy of estimating the contaminant release potential from a source area relies on the general observation that the most mobile contaminants are those with the highest vapor pressures. Further, the rapid release compartment contains the contaminant mass that is "available" for the partitioning from the soil to water, living membranes, or to pore space gases.

The first step in the method of this invention is to identify the location of the dense non-aqueous phase liquids present in the contaminated site in terms of the "available" or "rapid release fraction" contaminants of concern, such as benzene and naphthalene, using protocols that are known to those skilled in the art, such as the water leaching column method. When applying this approach to a site, the site is divided into a grid and a soil core is taken from each grid element. An example of a commercial system suitable for performing the coring operation is the GEOPROBE® soil sampling system available from Geoprobe Systems in Salina, Kans. using a 2" or 3" diameter Shelby tube sampler. Soil gas data using a photoionization detector (PID) or flame ionization detector (FID) is collected from the soil core. The soil gas data is used as a screening tool to select locations along the core for soil samples to be collected for laboratory testing for contaminant mobility and availability to receptors such as groundwater, ecological organisms and humans. Based upon this body of data, a three-dimensional mapping of the rapid release fraction or available fraction of the contaminant(s) is performed, which is used to effectively place the heating system, vacuum extraction wells and sweep gas injection wells. The end result of this step is the identification of the true subsurface source area.

Having located the subsurface source area, drainable water is removed from the treatment zone where the thermochemical solidification will be applied. This may only require physical pumping if the contamination is located in an area that is drainable. If it is not readily drainable, the source area to be treated may have to be hydraulically isolated using commercially available barriers such as sheet piles, slurry walls, or in-situ grouted walls. Once the source area is isolated from rapid infiltration of groundwater, it can be drained using devices such as mechanical pumps. Alternatively, prefabricated vertical drains may be used for dewatering if especially tight soils are encountered in the source areas.

Figure 1:
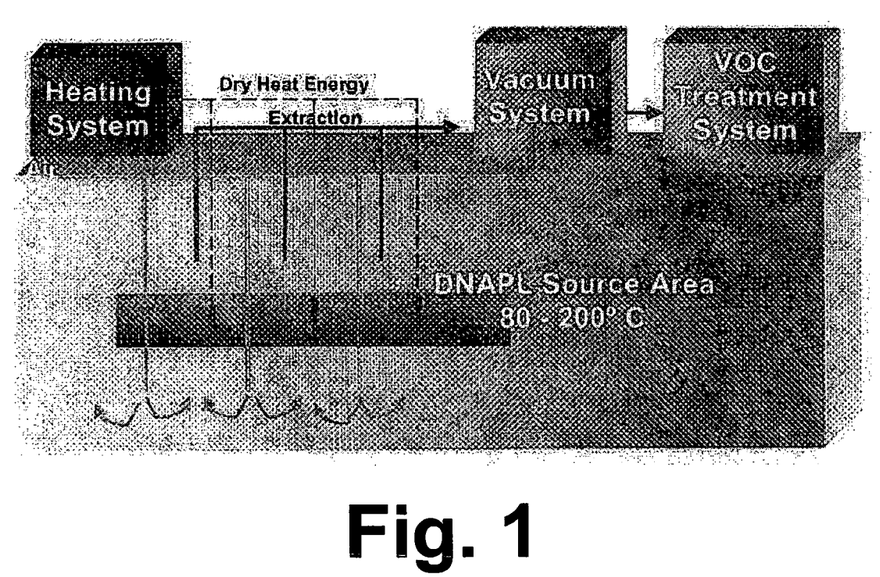
FIG. 1 is a general schematic diagram of the in-situ thermochemical solidification method in accordance with one embodiment of this invention applied to a landfill or a contaminated site.

After removal of the free water, the system components are installed using the general configuration shown in FIG. 1. The placement of each of the components in the subsurface is based upon the data obtained in the initial step regarding the spatial distribution of the rapid release fraction of the contaminant(s). If the site is very large and if the distribution of the rapid release fractions covers an extensive area, treatment may be conducted in sections. In most cases, the overall strategy of the placement of the treatment zones will be the targeting of source areas having a high rapid release fraction mass.

Following the removal of free water and the installation of the system components, the dense non-aqueous phase liquids treatment zone is then heated using thermal heating that does not add water or steam to the treatment zone. Commercial heating technologies that can be employed include resistive heating, 6-phase heating, RF heating, and conductive heating using in-ground heat exchangers, or any other method that delivers dry heat to the subsurface source area. In accordance with one particularly preferred embodiment of this invention, the treatment zone is heated to a temperature in the range of about 80° C. to less than the boiling point of naphthalene (about 218° C.). Temperatures in the range of about 120° C. to about 160° C. will typically result in the removal of a sufficient mass of the solubilizing fraction (volatile aromatic and aliphatic compounds) to allow the dense non-aqueous phase liquids to be solidified. As a result, the dense non-aqueous phase liquids material is transformed from liquids that are characteristically hazardous to a solid material that can pass the TCLP test as a non-hazardous waste material. During this transformation, a significant mass of the lighter hydrocarbons that represent the solubilizing fraction is volatilized from the dense non-aqueous phase liquids mass and is removed from the dense non-aqueous phase liquids through extraction wells located within or proximal to the heated dense non-aqueous phase liquids treatment zone.

During heat addition, three phases of system operation may be contemplated: Phase I—transitional temperature ramp-up—during which the temperatures in the treatment zone are increased from ambient temperature to the target temperature and much of the residual water content of the treatment zone is driven off; Phase II—rapid mass release of the solubilization fraction—during the initial time period at which the treatment zone is at the target temperature (extending for less than a week), the vapor pressures of the light hydrocarbons in the dense non-aqueous phase liquids are increased and the solubilizing fraction is released from the dense non-aqueous phase liquids in accordance with Henry's Law and Ficks Law predictions. During this phase, a large mass of volatiles is initially given off from the liquids and solids in the dense non-aqueous phase liquids treatment zone and into the gas phase of the interstitial pores of the soil. These gas emissions are collected through an extraction well system described herein below. During this period, the extraction wells are operated to generate a highly concentrated gaseous stream of volatile organic compounds; and Phase III—enhanced extraction of the residual solubilization fraction—during which period of time the system is operated to utilize a combination of methods to enhance the removal of the solubilizing fraction remaining in the dense non-aqueous phase liquids zone after the initial release. Enhancements include, high vacuum, passing of sweep gas into the treatment zone, and the introduction of gaseous chemical oxidants in the gaseous phase.

Removal of the solubilizing fraction that is initially thermally desorbed from the treatment zone dense non-aqueous phase liquids material is carried out in accordance with one embodiment of this invention using a system of vacuum extraction wells. Vacuum extraction wells may be either vertically or horizontally oriented and may vary in diameter from 1–3 inches or greater. A commercially available vacuum blower may be used. It may be desirable, but not necessary, that the blower contain a variable speed drive motor with a high degree of fluid flow range. Transmission wells and lines should be compatible for operating vacuum systems up to about 27 inches of mercury. During the contemplated Phase I described herein above, the vacuum extraction system is operated at a flow sufficient to remove moisture from the treatment zone. A condenser may be used during this time to capture the water fractions released during Phase I heating. During the contemplated Phase II, the vacuum extraction system removes the solubilizing fraction (VOC fraction) that is rapidly released once the target temperature is achieved and residual water is removed from the treatment zone.

In accordance with one embodiment of this invention, if needed, the treatment zone is purged with a sweep gas to achieve more rapid and efficient removal of the solubilizing fraction of the dense non-aqueous phase liquids. The sweep gas is injected into or below the dense non-aqueous phase liquids treatment zone. The extraction wells are simultaneously operated to remove the off-gas and the sweep gas from the treatment zone. Sweep gases that may be employed in the process of this invention include air, nitrogen, helium or any other suitable inert gas.

In addition to sweep gas, other enhancements may also be applied to drive the light solubilizing fraction out of the dense non-aqueous phase liquids and achieve dense non-aqueous phase liquids solidification. Among these enhancements are: temperature spiking in the dense non-aqueous phase liquids treatment zone for short periods of time to achieve very high transient vapor pressure of the solubilizing fraction and increase the driving gradient for these compounds to be partitioned into the interstitial gas of the soil pores; increasing vacuum up to about 30 inches or more of mercury to drive the volatile solubilizing fraction out of the solids and liquids into the gas phase according to a more favorable Henry's Law partitioning; and addition of gaseous oxidants, such as ozone, into the sweep gas to partially oxidize the gaseous solubilizing compounds and cause a shift of the partitioning reaction toward increased partitioning from the dense non-aqueous phase liquids material to the gas phase.

Management of the volatile organic compounds (VOCs) that emerge from the treatment zone is accomplished in accordance with one embodiment of this invention by the use of appropriate off-gas treatment equipment. During Phase I described herein above when heat is applied to ramp the temperature to the target temperature, an off-gas stream is likely to have a very high humidity, but variable VOC content. During this time, condenser equipment may be employed to remove water from the gas stream. The effluent of the condenser can be passed either through a catalytic oxidation unit or through an activated carbon adsorption system.

During Phase II described herein above, a catalytic oxidation system or commercial flare is used to thermally destroy the concentrated VOCs in the off-gas stream. The VOCs comprise the solubilizing fraction that has been driven from the dense non-aqueous phase liquids treatment zone. An in-line PID measurement may be taken periodically in the off-gas stream and stored in a computer. When the cumulative PID measurements level off to a plateau, the sweep gas injection system is activated, causing the sweep gas to be injected into or below the dense non-aqueous phase liquids treatment zone.

During Phase III described herein above, as soon as the sweep gas is activated, the off-gas stream is switched from the catalytic oxidation system to an adsorbent system such as a granular activated carbon box for VOC control.

To facilitate operation of the VOC management system, sensors may be interfaced to a computer for automated control of the off-gas management system. Humidity sensors in the off-gas stream and thermistors in the dense non-aqueous phase liquids treatment zone may be used to determine when the Phase I transition period has been completed. The PID data taken from the off-gas stream can be compiled and analyzed to provide a basis for a decision to channel the off-gas stream from the catalytic oxidation unit to the activated carbon adsorption system. Computer control of the off-gas stream solenoid valves, the catalytic oxidation system and the carbon adsorption process can all be achieved with state of the art computer programming and controller equipment for ease of operation.

Performance of the in-situ thermochemical solidification method of this invention may be verified through a number of diagnostic measurements: 1) measurements of PID and/or FID in the extraction wells and in gas phase piezometers proximal to the treatment zone during a period when the sweep gas has been discontinued; and 2) direct follow-up soil sampling and analysis to determine the mobility of contaminants after application of the thermochemical solidification method of this invention. Regarding the first diagnostic measurement, substantial decreases in PID or FID measurements indicates significant reductions in the content of the solubilizing fraction of the dense non-aqueous phase liquids. Regarding the second diagnostic measurement, the same tests used in the initial step of the disclosed method as discussed herein above would be used in these determinations.

EXAMPLES

In this example, thermochemical solidification was applied to the treatment of dense non-aqueous phase liquids in a gas holder of an MGP site that was 50 feet in diameter and 22 feet deep. The holder had already been decommissioned and what remained is the subsurface holder tank that had been filled in with demolition materials and soil. Soil borings and PID profile measurements showed that high PID readings were obtained in a layer that extends from the bottom of the holder to 6 feet above the bottom of the holder. Contaminant mobility testing of soil samples showed that 90 percent of the rapid release fraction contaminant mass was located in the 6 ft dense non-aqueous phase liquids layer at the bottom of the holder. This layer was thus targeted for thermochemical solidification. The dense non-aqueous phase liquids layer contained some free water and the composition of the drained soil/dense non-aqueous phase liquids material was as follows: 1) DNAPL content=10%; 2) solubilizing fraction of DNAPL=1%. The 6 ft treatment zone contained about 61 tons of dense non-aqueous phase liquids organic compounds, of which the light solubilizing fractions amounted to about 6 tons.

Resistance heating elements were installed in the mid section of the dense non-aqueous phase liquids layer. A commercial resistance heating system was sized to deliver sufficient thermal heat input to raise the temperature of the dense non-aqueous phase liquids layer to the target temperature range within 5 days. Vacuum extraction wells, air injection wells and an off-gas treatment system were installed. In operation, the system was first heated to the targeted temperature over a 5 day period. Operation of the vacuum extraction well system was initiated during this heating period. When the treatment zone was brought up to temperature, about 5 tons of rapid release fraction materials were released within the first week of operation. During this period, a flare was operated to treat the off-gas stream. In this initial heating period, the PID readings in the off-gas decreased in concentration until a plateau was reached. The off-gas stream was then channeled to a carbon box and an air sweep gas stream was introduced into the air injection system at rates of about 30–100 scfm. Periodically, the air stream was temporarily interrupted and a set of PID measurements taken from gas phase piezometers to monitor the progress of treatment. When the piezometer PID leveled out, the treatment process was discontinued.

Post treatment coring was performed and it was determined that the PID readings of the treatment zone had been reduced by more than 95%. Follow-up sampling showed that more than 90% of the rapid release fraction of benzene was removed from the dense non-aqueous phase liquids treatment zone and that the dense non-aqueous phase liquids material itself passed TCLP testing for benzene and naphthalene, indicating that the material can be disposed of or left in place as a non-hazardous waste.

In this example, large laboratory-based TCS prototype testings were performed. Elements of this test included:

[1] An apparatus consisting of an 8-ft long (2" diameter) vertical glass column that was outfitted with heat tracing, temperature control, and vacuum extraction (exterted at the top of the column)
[2] Depth of concentrated soil/DNAPL in the column of 6 feet
[3] Dimensions of the large TCS column selected to simulate the mass transfer of volatile and semi-volatile contaminants in one direction at a path length that represents a realistic radius of influence for field-based vacuum extraction
[4] No sweep gas used in column tests
[5] Test duration of one week
[6] Measurements of vapor pressure, total concentrations and mobility of contaminants of concern before and after TCS treatment.

More detailed descriptions of the methods used in large scale laboratory thermal solidification are given in the following sections:

Sample Preparation

Two large samples from two different sites (Sites 1 and 2) of tar DNAPL/soil mixtures were prepared to pack in the large-scale column for the thermochemical transformation. The sample from Site 1 was a pumpable DNAPL-saturated free product and did not represent one typically found on in-situ sites. This material showed a very high PID (high vapor pressure) in an initial screening test. Therefore, this material was amended with sand (three parts sand to one part free product). The sample from Site 2 was more representative of the in-situ sampling of MGP sites. This sample was obtained from porous subsurface strata having a high grit content. The sample measured a moderate initial PID ready and, therefore, did not require mixing with sand. This sample had some woody material associated with it. The large particles and rocks were, however, removed before packing in the column.

Vapor Pressure Measurement

Vapor pressures in the two test samples were measured using photoionization detector (PID) equipment. The PID of the samples was taken by transferring a small aliquot of the samples in a 4-oz jar, equilibrating the contents of the jar in at least 2 hours and measuring PID through a special cap for the jar outfitted with a special fitting. Benzene PID and total PID were measured. Benzene was measured using UltraRAE PID meter (Ray Instruments). Benzene (5 ppm) was used as standardized gas. This equipment used a resin absorbing tube to absorb all compounds but benzene. Total PID was measured using MiniRAE 2000 (Ray Instruments). The instrument was calibrated using standardized isobutylene gas (100 PPM). These instruments were calibrated each day before use. The benzene and total PID were also measured at the bottom of the large laboratory column by removing the glass wool and the sand at bottom of the columns and inserting the PID meters through the openings.

Operation

Large laboratory TCS prototype experiments were performed in 8-foot columns. Two 4-foot columns were combined using a dual neoprene coupler (Ace glass, Vineland, N.J.). The glass wool was packed into a 3" space at the bottom followed by 2" of sand. The material was filled up to 5 to 6.5 ft. in the column. The weight of the material was in the range of 5–6 Kg. A mechanical vibrator/vacuum pump was used to pack the columns. A custom-built profile probe (OSK2K524, Omega Engineering) was used to measure the temperature at each foot height from the bottom of the column. The thermisters were housed in a stainless steel tube (¼"). Temperature data were collected and compiled in a computer using a data acquisition board purchased from Omega Engineering (Cio-Das-TC 16 Channel T/C). The column was wrapped around with a 20-feet heating tap and was insulated.

Vapors escaping from the top of the column were condensed into a 3-liter condenser held at low temperature of 4° C. using chiller water heat exchangers. The residual vapors were trapped in a resin column (40 g Ambersorb-600). The vacuum was maintained between 5–10 inches Hg throughout the operation. The target temperature (90° C.) was reached within 4 hours and maintained using a PID controller. The exit port of the column was examined routinely to check for any blockage due to escaping vapors from the column. A gravimetric analysis was performed on the column by measuring the weight of the tar material before and after treatment. This was done using a balance (Mettler Model 12001, Toledo, USA) capable of measuring up to 12.1 kg of the material with a precision of 0.1 gram. The unfilled portion of the column was also wrapped and insulated to minimize the condensation within the column. The following was the mode of operation performed on the column:

1) Heat on day 1 to attain a temperature of 90° C.
2) Apply vacuum gradually to a maximum of 5 inches of mercury on day 1

3) Maintain temperature of 90° C. for 3-days
4) Spike and maintain temperature to 120° C. next 24 hrs
5) Lower temperature back to 90° C. on day 4
6) Maintain at 90° C. for next 4-days
7) Periodically monitor PID at top and bottom of column
8) Collect 4–7 samples of condensate resin to determine the nature of material removed
9) Measure the weight of material before and after the treatment Analysis These soil/tar samples were analyzed for different contaminants such as PAHs (EPA Method No 8270C)), BTEX (EPA Method No 8260B), & TPHs (Modified EPA Method No. 8015B). The TCLP BTEX/Naphthalene was determined using EPA Method 1311/8260B.

Vapor Pressure and Individual Compounds Variations

Figure 2:
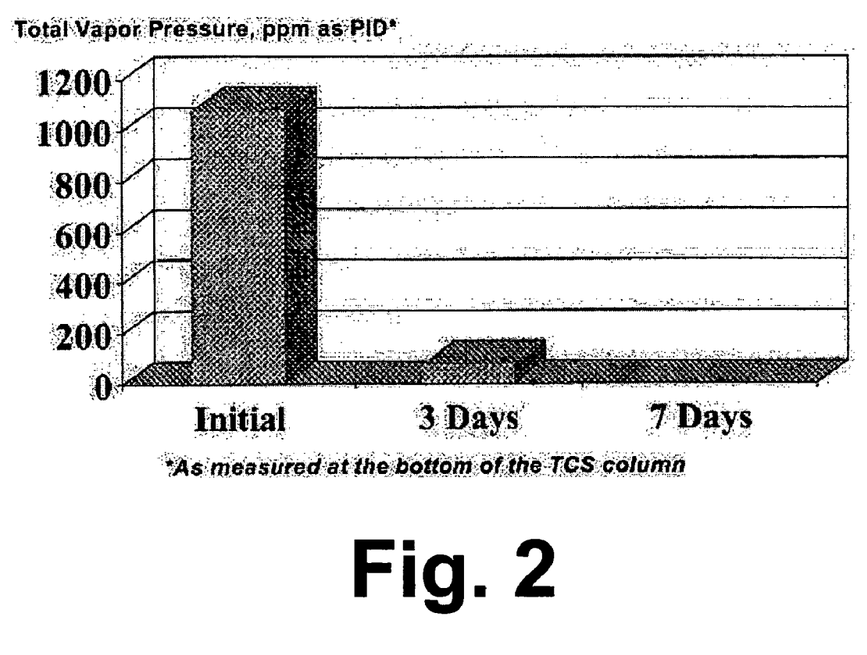
FIG. 2 is a diagram showing the effect of the treatment conditions of the invention on the total vapor pressure (representing available contaminants, where available means the fraction of contaminants that are not tightly bound to the soil matrix and which are readily leachable upon contact with water) of a sample of tar-contaminated soil.

Large column tests were performed for a period of 7 days on two different tars DNAPL/soil samples (Site 1 and 2). Total vapor pressure dropped more than 90% during first 3 days of the treatment for Site 2 sample and was further reduced to greater than 99% during one week of treatment (FIG. 2). These findings suggest that most rapid release light fractions were removed during thermal treatment.

Figure 3:
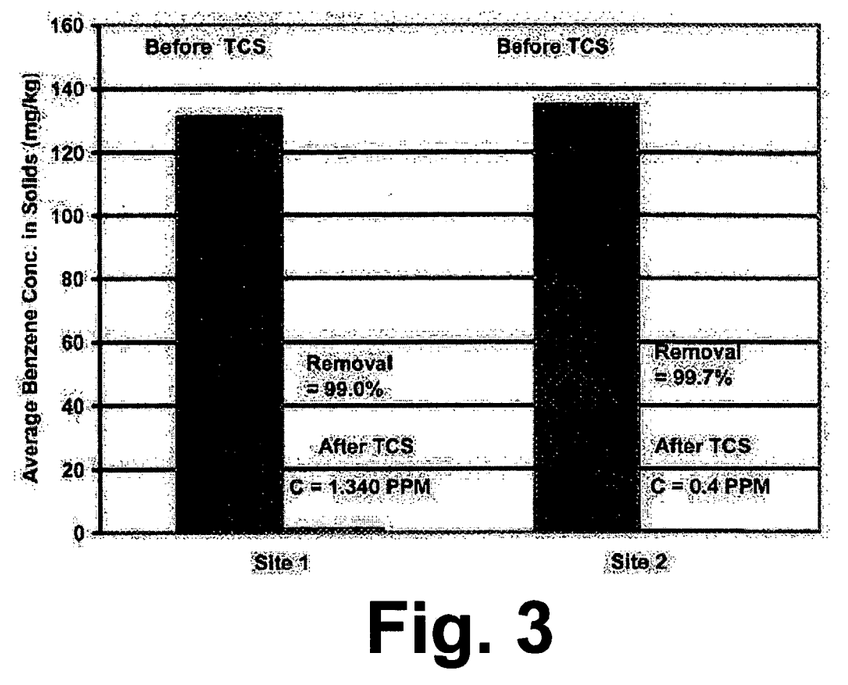
FIG. 3 is a diagram showing the effect of the treatment conditions of the invention on the benzene vapor pressure (representing the available fraction of benzene) of a sample of tar-contaminated soil.
Figure 4:
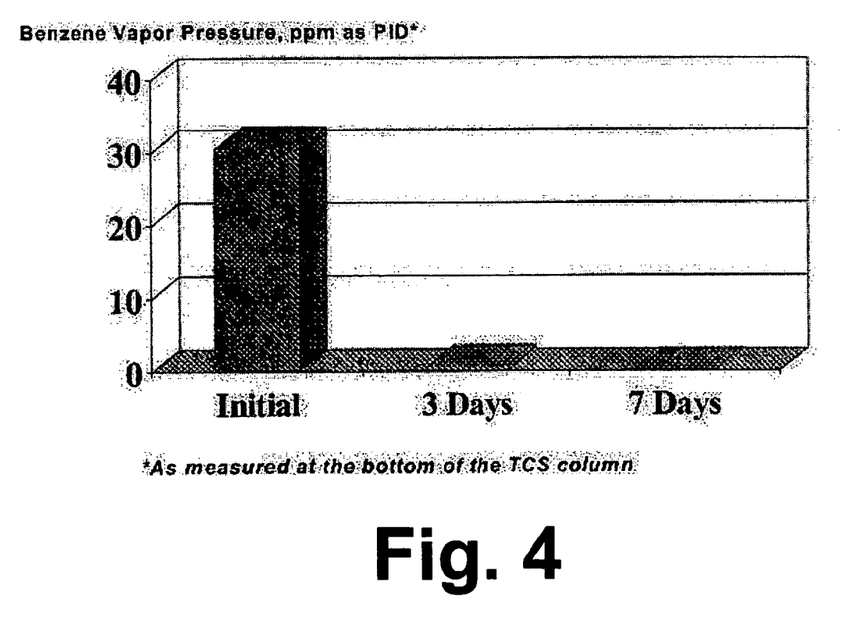
FIG. 4 is a diagram showing benzene removal from a tar sample in accordance with the method of this invention.
Figure 5:
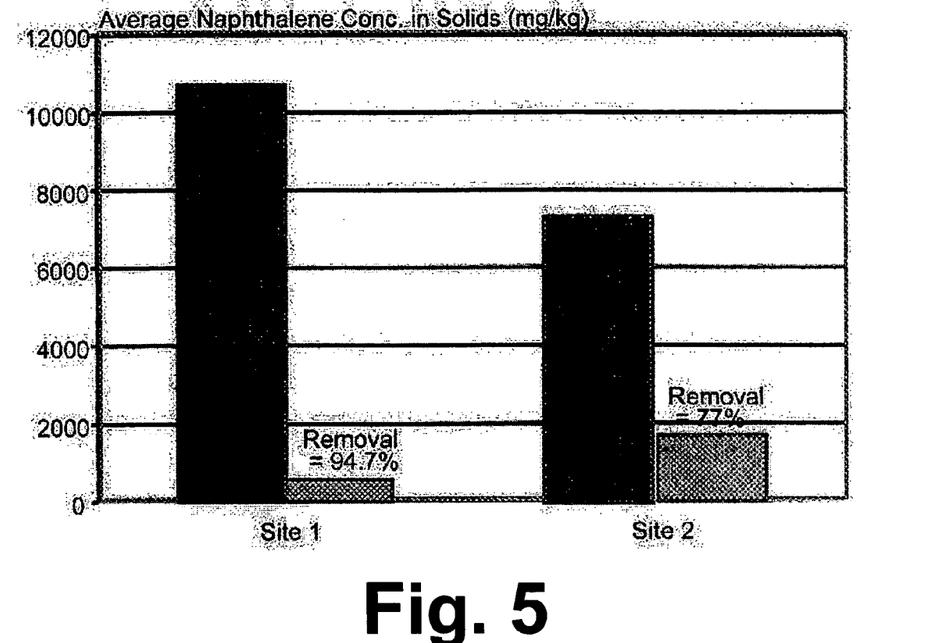
FIG. 5 is a diagram showing naphthalene removal from a tar sample in accordance with the method of this invention.
Figure 6:
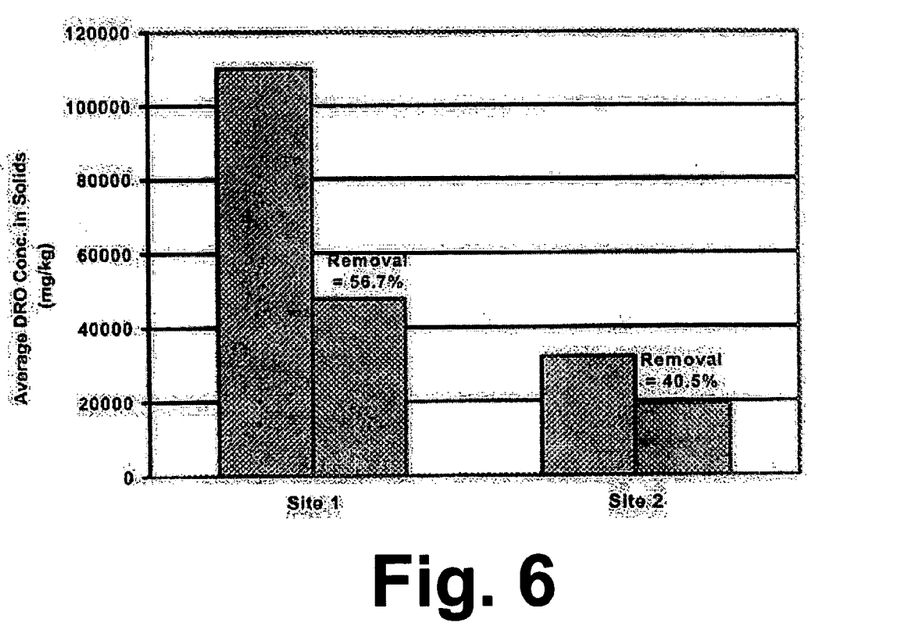
FIG. 6 is a diagram showing diesel range organics removal from a sample in accordance with the method of this invention.

Removal of benzene from the soil was almost complete as noted by the greater than 99% removal of vapor pressure within 3 days (FIG. 3). Thus, both naphthalene and benzene removal was evident from the large column at bottom of the column which is the most difficult location for removing light contaminants. These findings were further confirmed by the mass concentration removal of benzene and naphthalene (FIGS. 4 and 5). Test results summarized (FIG. 6) for diesel range organics (DRO) showed relatively less removal of DROs. This could be due to the presence of heavy oils in the samples.

Figure 7:
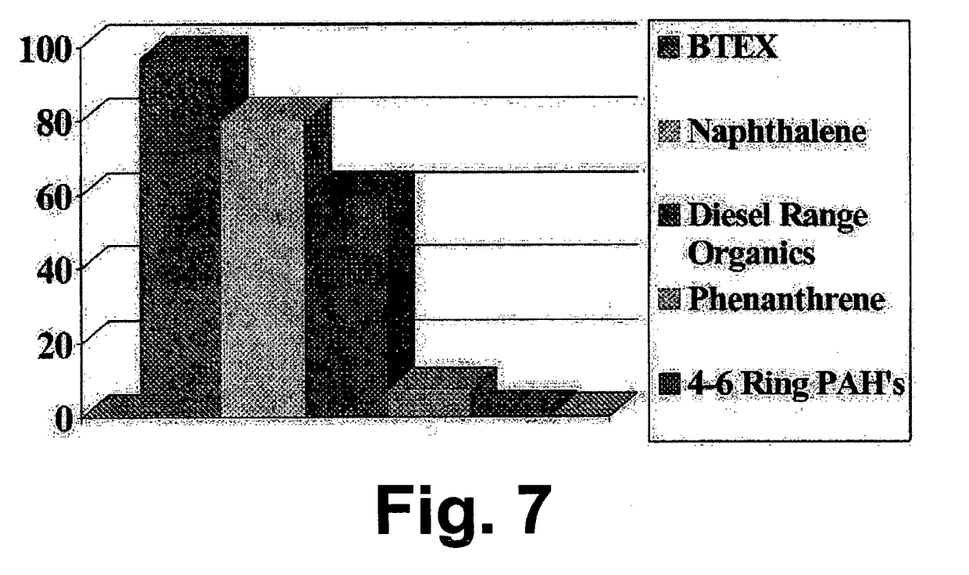
FIG. 7 is a diagram showing comparative removals from a sample employing the method of this invention.

The removal rates of various compounds are summarized in FIG. 7. From these results, it is evident that benzene showed the most removal followed by naphthalene, DRO, phenanthrene and the higher ring compounds. Thus, low temperature treatment removes only a limited amount of overall mass (<5% of soil weight) but efficiently removes contaminants of concern and renders soil harmless.

Effect of TCS on TCLP and Contaminant Mobility

Figure 8:
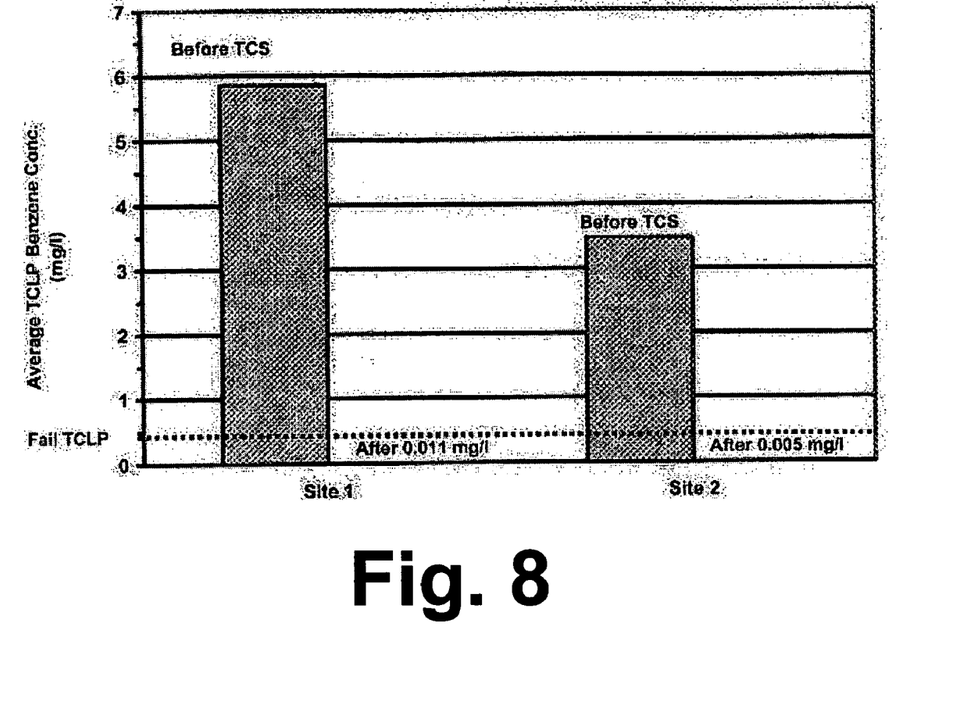
FIG. 8 is a diagram showing TCLP levels of tars treated in accordance with the method of this invention before and after treatment.

TCLP tests performed on the two site samples suggest a significantly reduced level of volatile compounds (FIG. 8). These treated samples were further tested for mobility of various compounds as shown in FIGS. 9–12.

Figure 9:
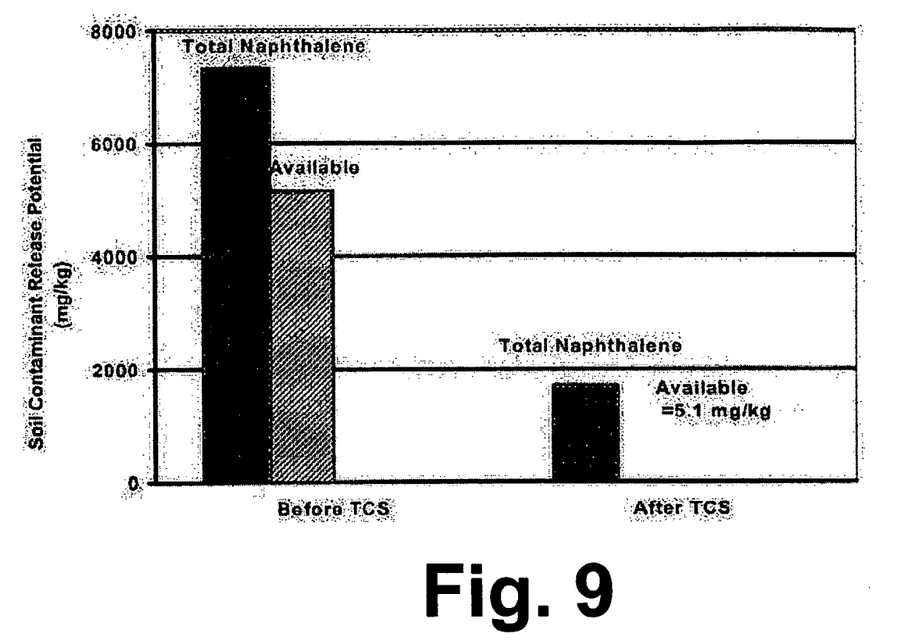
FIG. 9 is a diagram showing naphthalene release potential before and after treatment of a first sample in accordance with the method of this invention.
Figure 10:
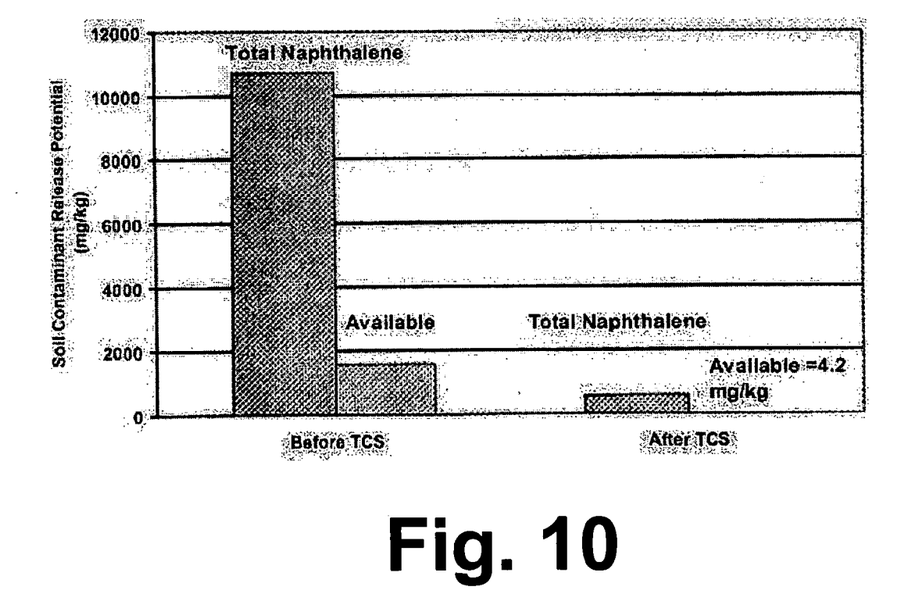
FIG. 10 is a diagram showing naphthalene release potential before and after treatment of a second sample in accordance with the method of this invention.
Figure 11:
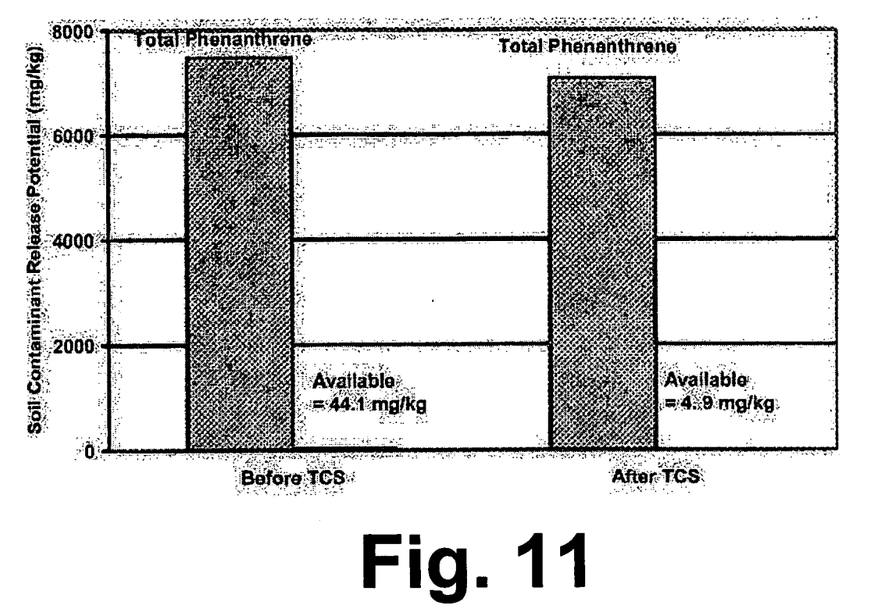
FIG. 11 is a diagram showing phenanthrene release before and after treatment of a first sample in accordance with the method of this invention.
Figure 12:
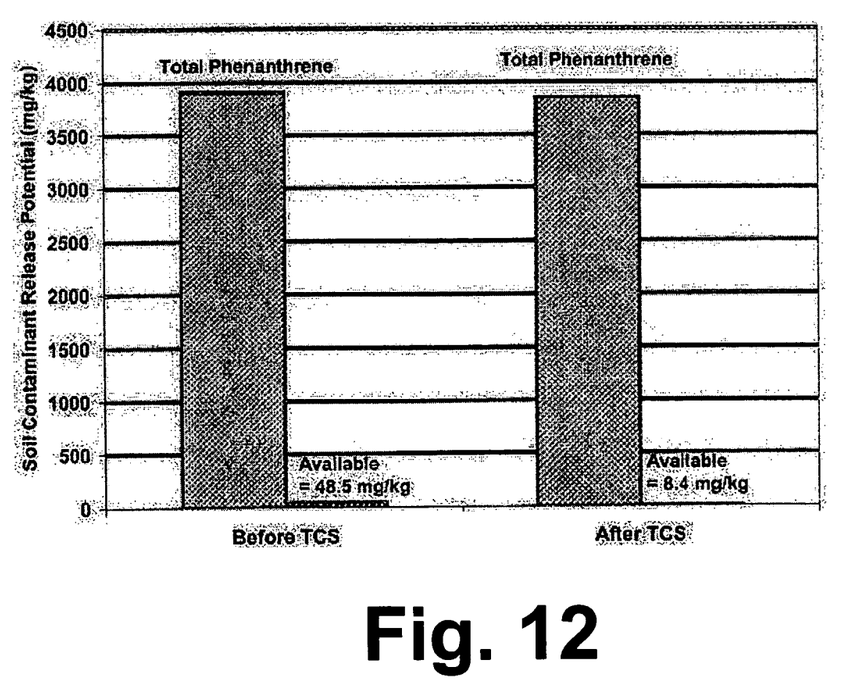
FIG. 12 is a diagram showing phenanthrene release before and after treatment of a second sample in accordance with the method of this invention.

Several tests were performed on the treated and the untreated samples to determine the contaminant mobility. These tests included determination of available levels of naphthalene, phenanthrene and the mobility testing by reconstitution treated soil/DNAPL samples in various agents (surfactant/solvent). The available (rapid release) fraction of naphthalene for Site 2 sample soil was reduced from greater than 70% of total mass for the untreated sample to less than 0.1% for the treated samples (FIG. 9). Likewise for Site 1 sample, the available fraction was reduced from 18% to less than 0.1% with TCS treatment as shown in FIG. 10. The available fraction was also reduced for phenanthrene for the two site soils (FIGS. 11 and 12). More than 80% reduction was noticed in the available fraction for each site soil. These findings suggest that the thermal solidification in the column successfully reduced the available fraction in site soils for the compounds of concern.

Figure 13:
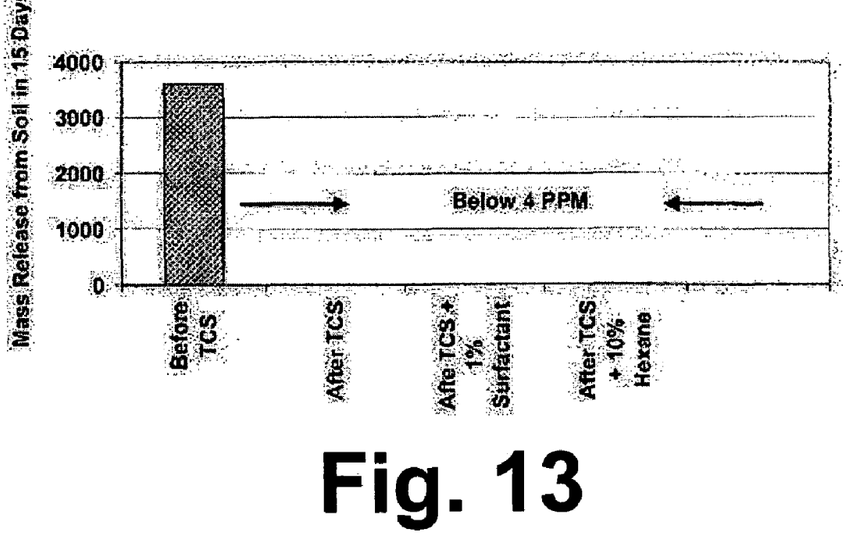
FIG. 13 is a diagram showing the stability of residues remaining from application of the method of this invention.

Treated samples were further tested for mobility testing by reconstitution of the TCS treated soils in 1% surfactant solution and hexane (10%). The results summarized (FIG. 13) suggest that once a DNAPL mass has been solidified it will not revert to a flowing DNAPL fluid, nor will it exhibit the treated samples alone or under surfactant/solvent added conditions. Thus, the thermal treatment made the contaminant mass immobilized to an extent that, even under adverse conditions (surfactant/solvent), no leaching of naphthalene is expected. These findings suggest that thermal treatment has effectively removed the risk for leaching of the contaminants of concern into groundwater.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for in-situ dense non-aqueous phase liquids treatment comprising the steps of:
   locating a subsurface source area comprising at least one rapid release contaminant;
   removing free water from said subsurface source area;
   heating said subsurface source area to a temperature suitable for extracting said at least one rapid release contaminant from said subsurface source area; and
   extracting said at least one rapid release contaminant from said subsurface source area, resulting in solidification of said dense non-aqueous phase liquids remaining in said subsurface source area.

2. A method in accordance with claim 1, wherein said at least one rapid release contaminant is extracted using vacuum extraction.

3. A method in accordance with claim 1, wherein a sweep gas is passed through said subsurface source area.

4. A method in accordance with claim 1, wherein said subsurface source area is heated to a temperature in a range of about 80° C. to about 200° C.

5. A method in accordance with claim 1, wherein said subsurface source area is heated by a dry heat source.

6. A method in accordance with claim 3, wherein said sweep gas is an inert gas.

7. A method in accordance with claim 6, wherein said inert gas is selected from the group consisting of air, nitrogen, helium and mixtures thereof.

8. A method in accordance with claim 3, wherein said sweep gas comprises at least one gaseous oxidant.

9. A method in accordance with claim 1, wherein said subsurface source area is identified by three dimensional mapping of PID/FID measurements.

10. A method in accordance with claim 2, wherein said vacuum extraction is carried out at a vacuum up to about 30 inches of mercury.

11. A method in accordance with claim 10, wherein said vacuum extraction is carried out at a vacuum in a range of about 5 to about 15 inches of mercury.

12. A method in accordance with claim 8, wherein said gaseous oxidant is ozone.

* * * * *